US012674950B2

(12) United States Patent
Wu

(10) Patent No.: US 12,674,950 B2
(45) Date of Patent: Jul. 7, 2026

(54) DIRECTION INDEPENDENT FIBER OPTIC RIBBON WITH MULTICORE OPTICAL FIBERS AND METHOD OF MAKING SAME

(71) Applicant: CORNING RESEARCH & DEVELOPMENT CORPORATION, Corning, NY (US)

(72) Inventor: Qi Wu, Painted Post, NY (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 357 days.

(21) Appl. No.: 18/328,075

(22) Filed: Jun. 2, 2023

(65) Prior Publication Data

US 2023/0393362 A1 Dec. 7, 2023

Related U.S. Application Data

(60) Provisional application No. 63/349,610, filed on Jun. 7, 2022.

(51) Int. Cl.
*G02B 6/44* (2006.01)
*G02B 6/02* (2006.01)

(52) U.S. Cl.
CPC ......... *G02B 6/448* (2013.01); *G02B 6/02042* (2013.01); *G02B 6/4403* (2013.01)

(58) Field of Classification Search
CPC ... G02B 6/448; G02B 6/02042; G02B 6/4403
USPC ........................................................ 385/114
See application file for complete search history.

(56) References Cited

U.S. PATENT DOCUMENTS

| | | | |
|---|---|---|---|
| 9,151,923 B2 | 10/2015 | Nielson et al. | |
| 9,453,979 B2 | 9/2016 | Nagashima et al. | |
| 2014/0219609 A1* | 8/2014 | Nielson .............. | G02B 6/38875 |
| | | | 29/428 |

(Continued)

FOREIGN PATENT DOCUMENTS

WO 2021/131977 A1 7/2021

OTHER PUBLICATIONS

"Polarity method selections in MTP / MPO fibre optics", Retrieved from: https://wbnetworks.com.au/blog/Polarity-method-selection-MTP-MPO, 2020, 8 pages.

(Continued)

*Primary Examiner* — Jerry M Blevins
(74) *Attorney, Agent, or Firm* — Adam R. Weeks

(57) ABSTRACT

Fiber optic ribbons and methods of making a fiber optic ribbon. The fiber optic ribbon includes one or more first multicore optical fibers each having a first core pattern and a first draw direction and a like number of second multicore optical fibers each having a second core pattern that is the same as the first core pattern and a second draw direction that is opposite the first draw direction. The first multicore optical fibers and the second multicore optical fibers are arranged relative to each other so that the first core pattern has a mirror-image symmetry with the second core pattern at both a first end and a second end of the fiber optic ribbon. Core polarity is thereby maintained between fiber segments without regard to the ribbon direction of the fiber optic ribbons in each fiber segment.

20 Claims, 15 Drawing Sheets

(56) References Cited

U.S. PATENT DOCUMENTS

2017/0299830 A1* 10/2017 Kokura .............. G02B 6/02042
2023/0017442 A1    1/2023 Takenaga et al.

OTHER PUBLICATIONS

Kengo Watanabe et.al.; "MPO Type 8-Multicore Fiber Connector With Physical Contact Connection," J. Lightw. Technol., vol. 34, 2016, 7 pages.
Kotaro Saito et al.; "Multi-core fiber connector using V-groove ferrule," Optical Fiber Technology, 23, 2015, pp. 24-29.
Ryo Nagase, "Optical Connectivities for Multicore Fiber," OFC 2020 TH31.1, 3 pages.
Ryuichi Sugizaki et.al. "Multicore fiber technologies toward practical use," Proceedings of SPIE—The International Society for Optical Engineering, v 11308, 2020, 8 pages.
Takashi Matsui, et al., "Design of 125 um cladding multi-core fiber with full-band compatibility to conventional single-mode fiber," European Conference on Optical Communication (ECOC) 2015, We1.4.5, (2015), 3 pages.
Tetsu Morishima et al; "Simple-structure low-loss multi-core fiber LC connector using an align-by-contact method," Optics Express, vol. 29, 9157, 2021, 3 pages.
Tetsu Morishima et.al.; "MCF-enabled Ultra-High-Density 256-core MT Connector and 96-core Physical-Contact MPO Connector," OFC 2017, 3 pages.
Yusuke Sasaki, et.al.; "Optical Fiber Cable Employing 200 μm-Coated Multicore Fibers for High Density Wiring in Datacom," OFC 2021, Tu6B.2, 3 pages.

* cited by examiner

DIRECTION INDEPENDENT FIBER OPTIC RIBBON WITH MULTICORE OPTICAL FIBERS AND METHOD OF MAKING SAME

PRIORITY APPLICATION

This application claims the benefit of priority of U.S. Provisional Application No. 63/349,610, filed on Jun. 7, 2022, the content of which is relied upon and incorporated herein by reference in its entirety.

TECHNICAL FIELD

This disclosure relates generally to fiber optic cables, and more particularly, to ribbons of multicore optical fibers that provide direction-independent connectivity, and methods of making direction independent ribbons of multicore optical fibers.

BACKGROUND

Optical fibers are useful in a wide variety of applications, the most common being as part of the physical layer of a communication protocol through which network nodes communicate over a data network. Benefits of optical fibers include wide bandwidth and low noise operation. Continued growth of the Internet has resulted in a corresponding increase in demand for network capacity. This demand for network capacity has, in turn, generated a need for increased bandwidth between network nodes.

Multicore optical fibers are optical fibers in which multiple cores are contained within in a common cladding. Multicore optical fibers function essentially as a bundle of single-core fibers, thereby providing increased capacity as compared to individual single-core optical fibers. The use of multicore optical fibers has yet to be widely adopted for long haul applications due to advances in technology that have enabled increased transmission rates over existing single-core optical fibers, such as dense wavelength division multiplexing and coherent optical communication techniques. Nevertheless, with the rapid growth of hyperscale datacenters, and the maturing of dense wavelength division multiplexing and coherent optical communication technologies, the use of multicore fiber optic cables is expected to increase.

Datacenter campuses provide computing spaces for housing computer systems and associated network components. These computing spaces are typically spread across multiple buildings located on the campus. To facilitate connections between these computing spaces, conduits or other cable ducts configured to carry fiber optic cables are typically installed between the computing spaces when the datacenter is constructed. The distances between computing spaces within a datacenter campus are typically less than 2 km, and massive numbers of optical fibers are used to interconnect these spaces both within each campus as well as between regional campuses. Preexisting cable ducts between computer spaces have a limited amount of space that is difficult to expand. Accordingly, as the need for higher fiber counts continues to increase, multicore optical fibers have the potential to provide a solution to this limited amount of cable duct space.

FIGS. 1A and 1B depict exemplary multicore optical fibers 10 each representing a separate fiber span. Each multicore optical fiber 10 includes a cladding 12, a plurality of cores 14a-14d contained within the cladding 12, a front end face 16, a back end face 18, and a fiber draw direction extending from the front end face 16 to the back end face 18, as indicated diagrammatically by single-headed arrows 20. The cores 14a-14d are spaced symmetrically around a center axis of the cladding 12, and each end face 16, 18 includes a marker 22 that identifies a reference core (e.g., core 14a) of the multicore optical fiber 10. In FIG. 1A, the multicore optical fibers 10 are oriented so that the fiber draw direction of each fiber span is in the same direction. In FIG. 1B, the multicore optical fibers 10 are oriented so that their fiber draw directions are in opposite directions.

In order to maintain a consistent core polarity between connected fiber spans, the multicore optical fibers 10 must be oriented so that they have the same fiber draw direction. In the depicted case, core polarity is maintained when the front end face 16 of one multicore optical fiber 10 interfaces with the back end face 18 of another multicore optical fiber. As shown by FIG. 1A, matching fiber draw directions enables the end faces 16, 18 to be coupled such that each core 14a-14d on the front end face 16 is aligned with a correspondingly positioned core 14a-14d on the back end face 18. Core polarity can thereby be maintained across multiple fiber spans that have matching fiber draw directions.

In contrast, when the multicore optical fibers 10 of two spans are oriented so that they have opposing fiber draw directions as in FIG. 1B, two like end faces (e.g., two back end faces 18) need to be interfaced. With the exemplary multicore optical fibers 10 of FIGS. 1A and 1B, fiber spans having opposite fiber draw directions can at best be connected such that the optical fibers are cross-connected. This cross-connection results in an optical beam entering a specific core (e.g., core 14a) of one span being emitted from a different core (e.g., core 14b) of the other fiber span.

FIGS. 2A and 2B depict another variation of the exemplary multicore optical fibers 10 in which the cores 14a-14d are arranged in an asymmetrical pattern. Specifically, one core (e.g., core 14a) is radially offset relative to the other cores (e.g., cores 14b-14c). This asymmetrical arrangement enables individual cores 14a-14d to be identified without the need for a marker 22. As with the fiber spans depicted by FIG. 1A, the multicore optical fibers 10 depicted by FIG. 2A are oriented so that they have the same fiber draw direction. This enables the end faces 16, 18 to be coupled such that each core 14a-14d on the front end face 16 is aligned with a corresponding core 14a-14d on the back end face 18. Core polarity can thereby be maintained across the fiber spans of FIG. 2A. In contrast, the multicore optical fibers 10 depicted by FIG. 2B are oriented so that they have opposing fiber draw directions. This prevents the end faces 16, 18 from being coupled in a way that maintains either polarity or connectivity across the fiber spans of FIG. 2B.

As can be seen from FIGS. 1A-2B, in order to distinguish each core in a multicore optical fiber, radial symmetry of the core pattern must be broken. Radial symmetry may be broken by introducing a marker core 22 in parallel with the cores 14a-14d, as illustrated in FIGS. 1A and 1B, or by positioning at least one of the cores 14a-14d so that the core 14a-14d is in an "off position" (e.g., a radially non-symmetric position), as illustrated by FIGS. 2A and 2B. The marker core 22 or off position core 14a may be observed in any cross section of the multicore optical fiber 10. By designating the off position/marker core as a reference core, the rest of the cores can be identified through a naming convention. In other words, the core polarity of a multicore optical fiber may be defined by including at least one core with a mark-based or position-based asymmetry. A core polarity defined in this way is maintained regardless of the observer's viewpoint. Asymmetric core patterns look different at the front and back end faces 16, 18 of the multicore optical fiber 10 because each pattern as viewed at one end face is a mirror image of the pattern as viewed at the other end face. The resulting directional nature of multicore optical fibers connectivity is both profoundly different from a single core optical fiber and a source of connectivity issues.

FIGS. 3A-3C depict exemplary fiber optic ribbons 30 ("ribbons 30") each including a plurality of multicore optical fibers 10, e.g., four multicore optical fibers 10. Each multicore optical fiber 10 is configured as described above for FIGS. 1A-2B. Each ribbon 30 represents a separate fiber span 32, 34. Because the ribbons 30 in FIG. 3A have the same draw directions, both the multicore optical fibers 10 of each span, and the cores 14a-14b of each multicore optical fiber 10, can be aligned to maintain core polarity.

FIG. 3B depicts the effects of a change in the draw direction of the ribbon 30 of lower fiber span 34 so that the draw directions of the ribbons 30 are in opposite directions. As can be seen, the multicore optical fibers 10 of the upper fiber span 32 are no longer aligned with the corresponding multicore optical fibers 10 of the lower fiber span 34. That is, multicore optical fiber A of the upper fiber span 32 is aligned with multicore optical fiber D of the lower fiber span 34, multicore optical fiber B of the upper fiber span 32 is aligned with multicore optical fiber C of the lower fiber span 34, multicore optical fiber C of the upper fiber span 32 is aligned with multicore optical fiber B of the lower fiber span 34, and multicore optical fiber D of the upper fiber span 32 is aligned with multicore optical fiber A of the lower fiber span 34.

In addition, the cores within each multicore optical fiber 10 do not have matching core polarities, with core 1 of each upper fiber span multicore optical fiber 10 aligned with core 2 of its respective lower fiber span multicore optical fiber 10, core 2 of each upper fiber span multicore optical fiber 10 aligned with core 1 of its respective lower fiber span multicore optical fiber 10, core 3 of each upper fiber span multicore optical fiber 10 aligned with core 4 of its respective lower fiber span multicore optical fiber 10, and core 4 of each upper fiber span multicore optical fiber 10 aligned with core 3 of its respective lower fiber span multicore optical fiber 10.

FIG. 3C depicts the effects rotating the ribbon 30 of lower fiber span 34 180 degrees about its longitudinal axis in an attempt to correct the polarity of the multicore optical fibers 10. Although rotating the ribbon 30 of lower fiber span 34 brings each multicore optical fiber 10 into alignment with its respective multicore optical fiber 10 in the upper fiber span 32 (i.e., A→A, B→B, etc.) the polarities of the cores 14a-14d remain mismatched. Specifically, core 1 of each upper fiber span multicore optical fiber 10 is aligned with core 3 of its respective lower fiber span multicore optical fiber 10, core 2 of each upper fiber span multicore optical fiber 10 is aligned core 4 of its respective lower fiber span multicore optical fiber 10, core 3 of each upper fiber span multicore optical fiber 10 is aligned with core 1 of its respective lower fiber span multicore optical fiber 10, and core 4 of each upper fiber span multicore optical fiber 10 is aligned with core 2 of its respective lower fiber span multicore optical fiber 10. Thus, it should be apparent that it is not possible to maintain core polarity across spans of conventional ribbons 30 which include multicore optical fibers 10 and that have opposite draw directions.

In order for an optical beam coupled into a specific core at one end of a multicore optic fiber to emerge from the corresponding core at the opposite end of a fiber optic link including multiple fiber spans, core polarity must be maintained across each fiber span of the fiber optic link. Because it is not possible to maintain core polarity by simply rotating mirror-imaged end face patterns having more than two cores, multicore fiber spans in a multi-span fiber optic link must have the same fiber draw direction. This consistent fiber draw direction requirement means that multicore fiber spans with opposite fiber draw directions cannot be connected to provide a multi-span fiber optic link. In cases of symmetrically positioned multi-core arrangements, this leads to cross-connected signals in which optical beams coupled to one core emerge from a different core at the other end of the multi-span fiber optic link. In cases of asymmetrically positioned multicore arrangements, connecting the same end of each multicore optical fiber to each other leads to both core polarity mismatches and an inability to couple the optical beam across the fiber span for at least some of the cores.

When ribbons of multicore fibers are deployed as part of a structured cabling solution in hyperscale datacenters, the difficulties in managing core polarities of thousands of multicore optical fibers become intractable. Maintaining all multicore optical fiber spans so that they are directionally aligned is impractical at best, as it entails both tedious tracking of the ribbon ends and a requirement that network components have two types of multicore fiber interfaces so that they are compatible with both the front and back ends of the multicore optical fibers.

Thus, there is a need in the fiber optic industry for improved fiber optic ribbon and cable configurations that include multicore optical fibers, as well as methods of making such ribbons and cables, that maintain core polarity between fiber spans.

SUMMARY

In an aspect of the disclosure, an improved fiber optic ribbon is disclosed. The fiber optic ribbon includes a first multicore optical fiber and a second multicore optical fiber. The first multicore optical fiber has a first core pattern and a first draw direction, and the second multicore optical fiber has a second core pattern that is the same as the first core pattern and a second draw direction that is opposite the first draw direction. The first multicore optical fiber and the second multicore optical fiber are arranged relative to each other in the fiber optic ribbon so that the first core pattern has a mirror-image symmetry with the second core pattern at both a first end and a second end of the fiber optic ribbon.

In an embodiment of the disclosed fiber optic ribbon, the first multicore optical fiber and the second multicore optical fiber are arranged in an anti-parallel configuration.

In another embodiment of the disclosed fiber optic ribbon, the first multicore optical fiber and the second multicore optical fiber are part of a plurality of multicore optical fibers consisting of a first number of multicore optical fibers with the first core pattern and the first draw direction, and a second number of multicore optical fibers with the second core pattern and the second draw direction, and the first number of multicore optical fibers is equal to the second number of multicore optical fibers.

In another embodiment of the disclosed fiber optic ribbon, the mirror-image symmetry at both the first end and the second end of the fiber optic ribbon is about an axis of symmetry of the fiber optic ribbon at the respective end, there is a third number of the plurality of multicore optical fibers with the first draw direction on one side of the axis of symmetry, there is a fourth number of the plurality of multicore optical fibers with the second draw direction on the other side of the axis of symmetry, and the third number of the plurality of multicore optical fibers is equal to the fourth number of the plurality of multicore optical fibers.

In another embodiment of the disclosed fiber optic ribbon, the plurality of multicore optical fibers is arranged so that the draw direction of equally-sized subunits of multicore optical fibers alternates between the first draw direction and the second draw direction.

In another embodiment of the disclosed fiber optic ribbon, each subunit of the multicore optical fibers includes at least one multicore optical fiber and not more than the first number of multicore optical fibers.

In another embodiment of the disclosed fiber optic ribbon, the fiber optic ribbon has a longitudinal axis at each end normal to a cross section of the fiber optic ribbon, each longitudinal axis passes through a geometric center of the cross section of the fiber optic ribbon, and each axis of symmetry is normal to the longitudinal axis of the respective end of the fiber optic ribbon.

In another embodiment of the disclosed fiber optic ribbon, the fiber optic ribbon has an even number of the multicore optical fibers.

In another embodiment of the disclosed fiber optic ribbon, each of the first core pattern and the second core pattern includes a reference core indicated by one or more of a mark based asymmetry or a position based asymmetry.

In another embodiment of the disclosed fiber optic ribbon, both the first core pattern and the second core pattern follow a predetermined naming convention that uniquely identifies each core of the respective core pattern based on a position of the core relative to the respective reference core.

In another aspect of the disclosure, an improved fiber optic cable assembly is disclosed. The fiber optic cable assembly includes the first multicore optical fiber having the first core pattern and the first draw direction, the second multicore optical fiber having the second core pattern that is the same as the first core pattern and the second draw direction that is opposite the first draw direction, a first connector defining a first end of the optical cable assembly, wherein the first end of the first multicore optical fiber and the first end of the second multicore optical fiber are each secured to the first connector, and a second connector defining a second end of the optical cable assembly, wherein the second end of the first multicore optical fiber and the second end of the second multicore optical fiber are each secured to the second connector. The first multicore optical fiber and the second multicore optical fiber are arranged relative to each other in each of the first connector and the second connector so that the first core pattern has the mirror-image symmetry with the second core pattern at both the first end and the second end of the optical cable assembly.

In another aspect of the disclosure, an improved method of making a fiber optic ribbon is disclosed. The method includes providing the first multicore optical fiber having the first core pattern in the first draw direction, providing the second multicore optical fiber having the second core pattern that is the same as the first core pattern in the second draw direction that is opposite the first draw direction, and arranging the first multicore optical fiber and the second multicore optical fiber relative to each other in the fiber optic ribbon so that the first core pattern has the mirror-image symmetry with the second core pattern at both the first end of the fiber optic ribbon and the second end of the fiber optic ribbon.

In an embodiment of the disclosed method, arranging the first multicore optical fiber and the second multicore optical fiber relative to each other so that the first core pattern has the mirror-image symmetry with the second core pattern includes arranging the first multicore optical fiber and the second multicore optical fiber in an anti-parallel arrangement.

In another embodiment of the disclosed method, the first multicore optical fiber and the second multicore optical fiber are part of the plurality of multicore optical fibers consisting of the first number of multicore optical fibers having the first draw direction and the second number of multicore optical fibers having the second draw direction, and the first number of multicore optical fibers is equal to the second number of multicore optical fibers.

In another embodiment of the disclosed method, the fiber optic ribbon includes an axis of symmetry, the third number of the plurality of multicore optical fibers is equal to the fourth number of the plurality of multicore optical fibers, and the method further includes arranging the third number of the plurality of multicore optical fibers with the first draw direction on one side of the axis of symmetry, and arranging the fourth number of the plurality of multicore optical fibers with the second draw direction on the other side of the axis of symmetry.

In another embodiment of the disclosed method, the method further includes arranging the plurality of multicore optical fibers so that the draw direction of equally-sized subunits of the multicore optical fibers alternates between the first draw direction and the second draw direction.

In another embodiment of the disclosed method, each subunit of the multicore optical fibers includes at least one multicore optical fiber and not more than the first number of multicore optical fibers.

In another embodiment of the disclosed method, the first multicore optical fiber is provided from a first reel of multicore optical fiber wound in the first draw direction, and the second multicore optical fiber is provided from a second reel of multicore optical fiber wound in the second draw direction.

In another embodiment of the disclosed method, the method further includes winding a length of multicore optical fiber from a third reel onto the second reel, wherein the third reel of multicore optical fiber is wound in the first draw direction.

In another embodiment of the disclosed method, the method further includes identifying the reference core in each of the first core pattern and the second core pattern by providing one or more of the mark based asymmetry or the position based asymmetry to the core pattern.

In another aspect of the disclosure, an improved method of making a fiber optic cable assembly including a first end and a second end is disclosed. The method includes providing the first multicore optical fiber having the first core pattern and the first draw direction, providing the second multicore optical fiber having the second core pattern that is the same as the first core pattern and the second draw direction that is opposite the first draw direction, securing the first connector to the first end of the first multicore optical fiber and the first end of the second multicore optical fiber to define the first end of the fiber optic cable assembly, and securing the second connector to the second end of the first multicore optical fiber and the second end of the second multicore optical fiber to define the second end of the fiber optic cable assembly. The first multicore optical fiber and the second multicore optical fiber are arranged relative to each other in each of the first connector and the second connector so that the first core pattern has the mirror-image symmetry with the second core pattern at both the first end and the second end of the optical cable assembly.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

DETAILED DESCRIPTION

Figure 1A:
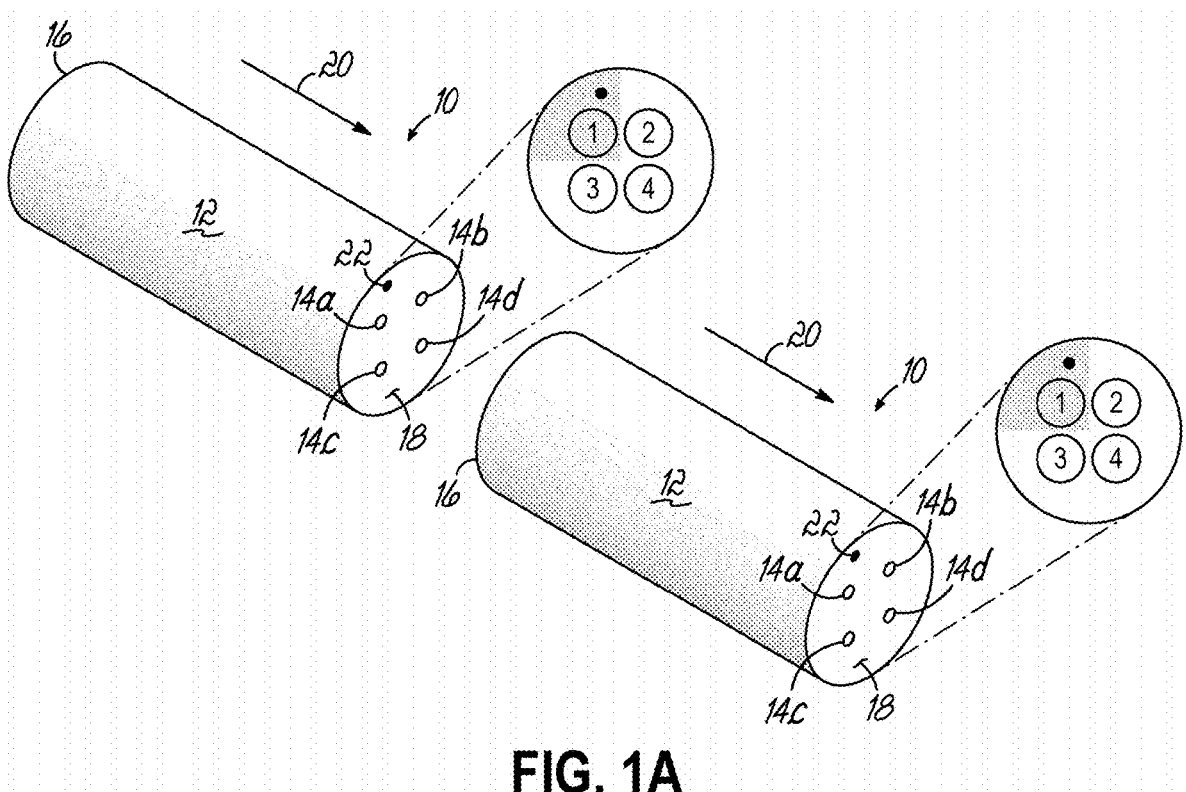
FIGS. 1A and 1B are perspective views of exemplary multicore optical fibers having a reference core identified by a marker and showing the effects of draw direction on core polarity.
Figure 1B:
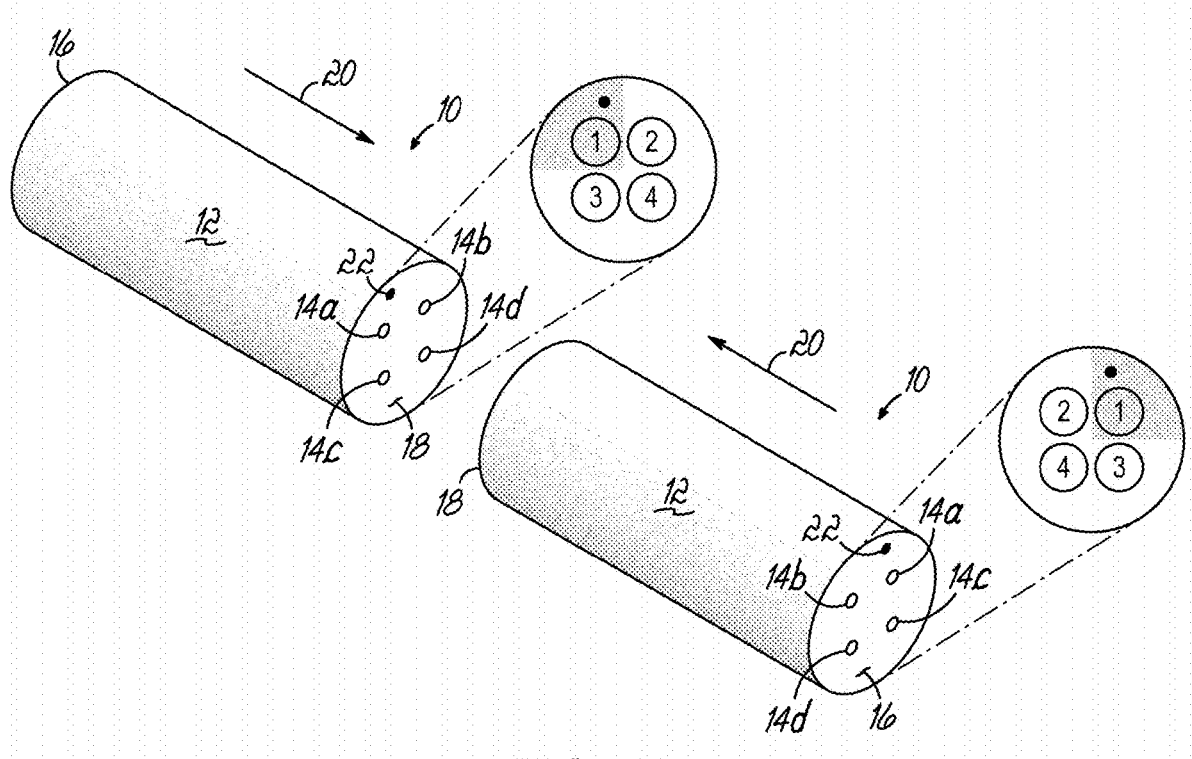
Figure 2A:
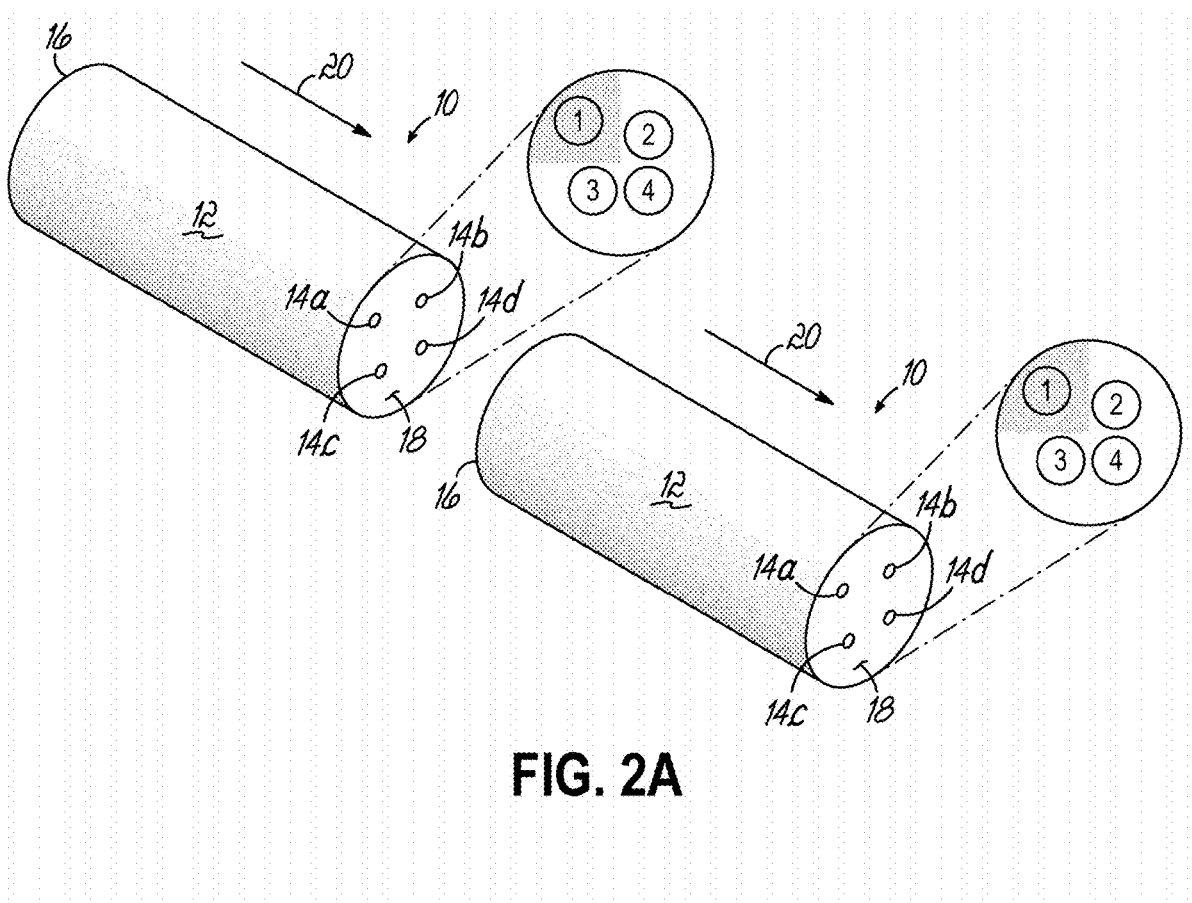
FIGS. 2A and 2B are perspective views of exemplary multicore optical fibers having a reference core identified by being in an off position and showing the effects of draw direction on core polarity.
Figure 2B:
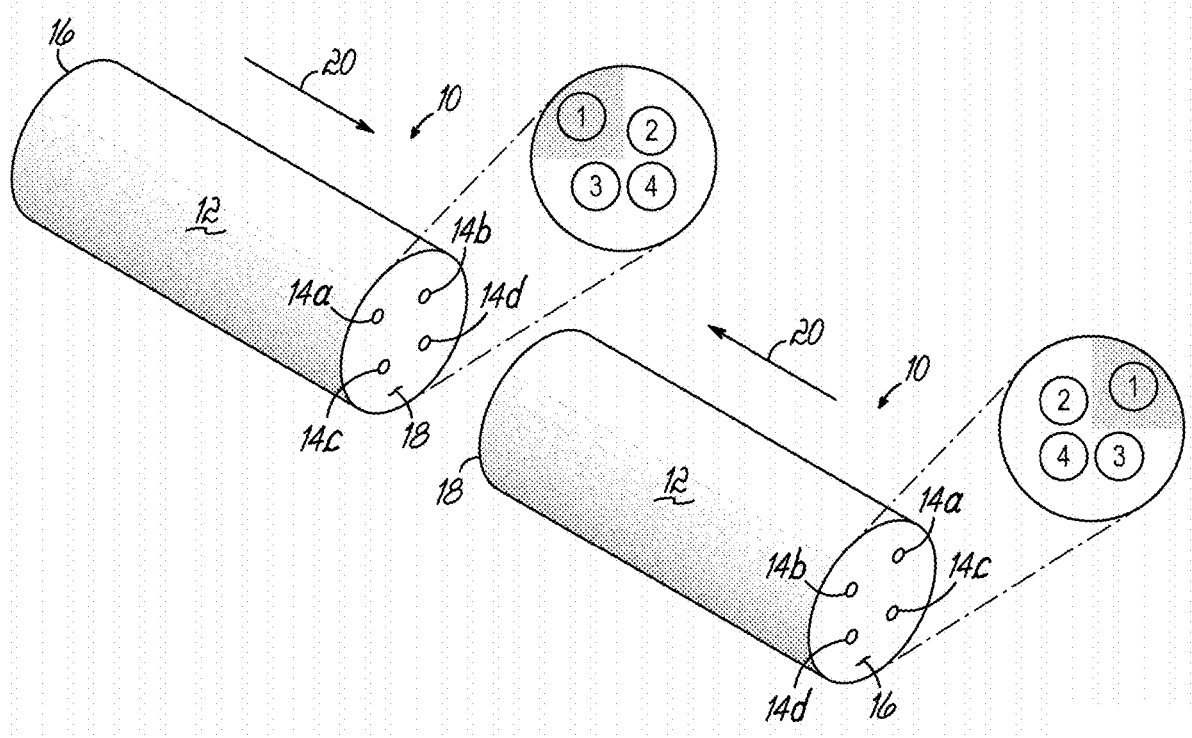
Figure 3A:
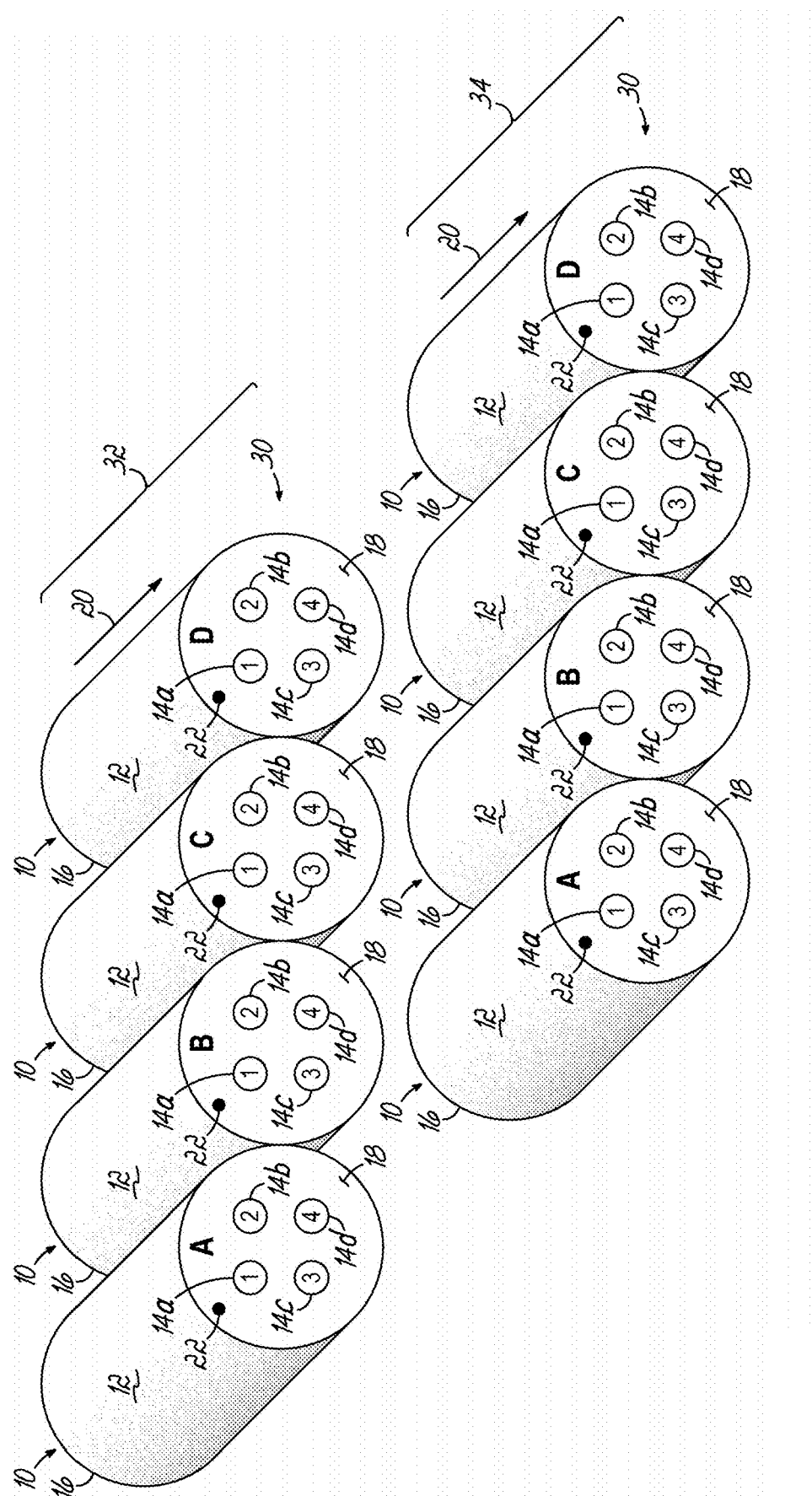
FIGS. 3A-3C are perspective views of exemplary ribbons each including a plurality of multicore optical fibers and showing the effects of draw direction on core polarity.
Figure 3B:
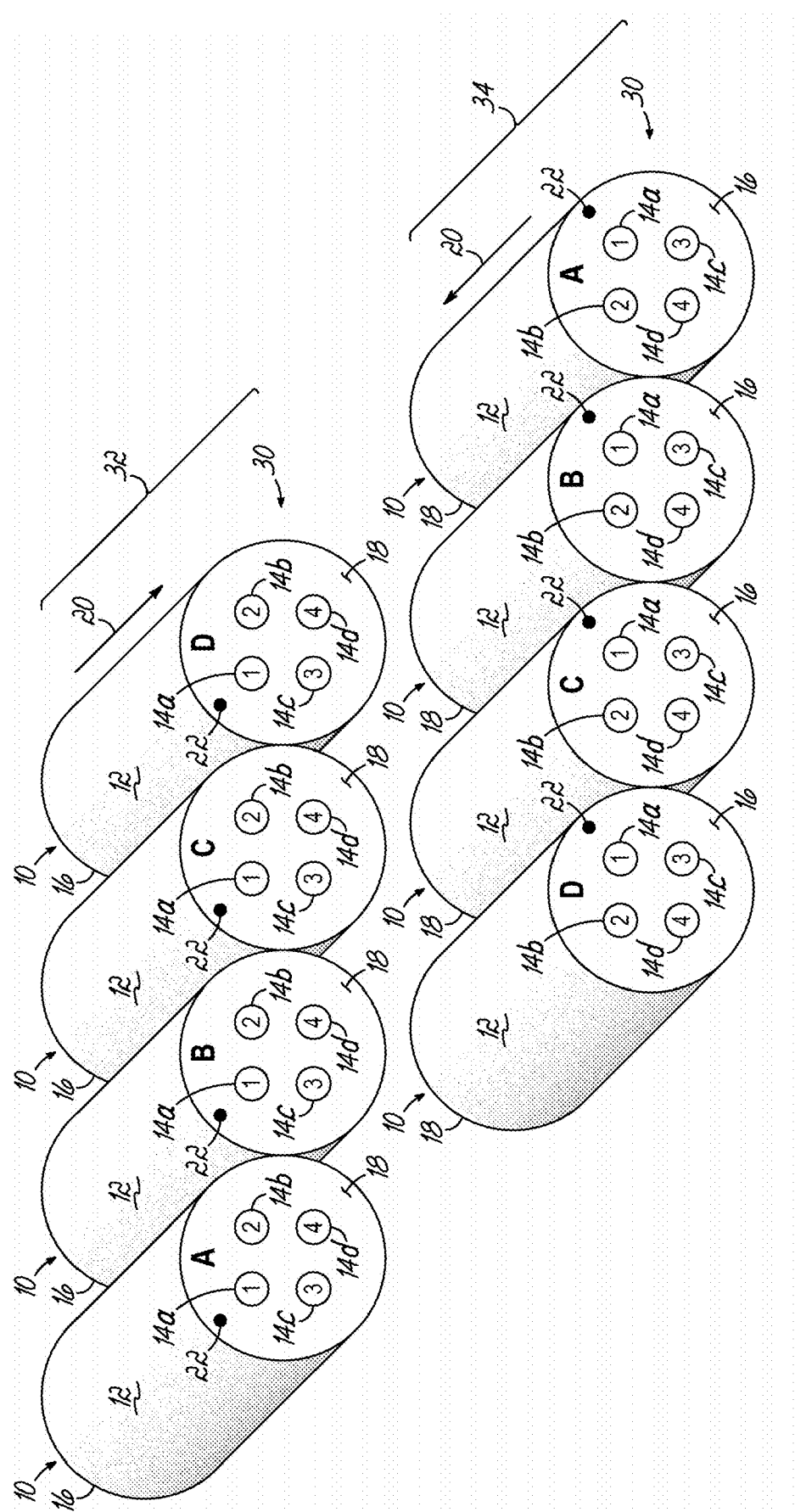
Figure 3C:
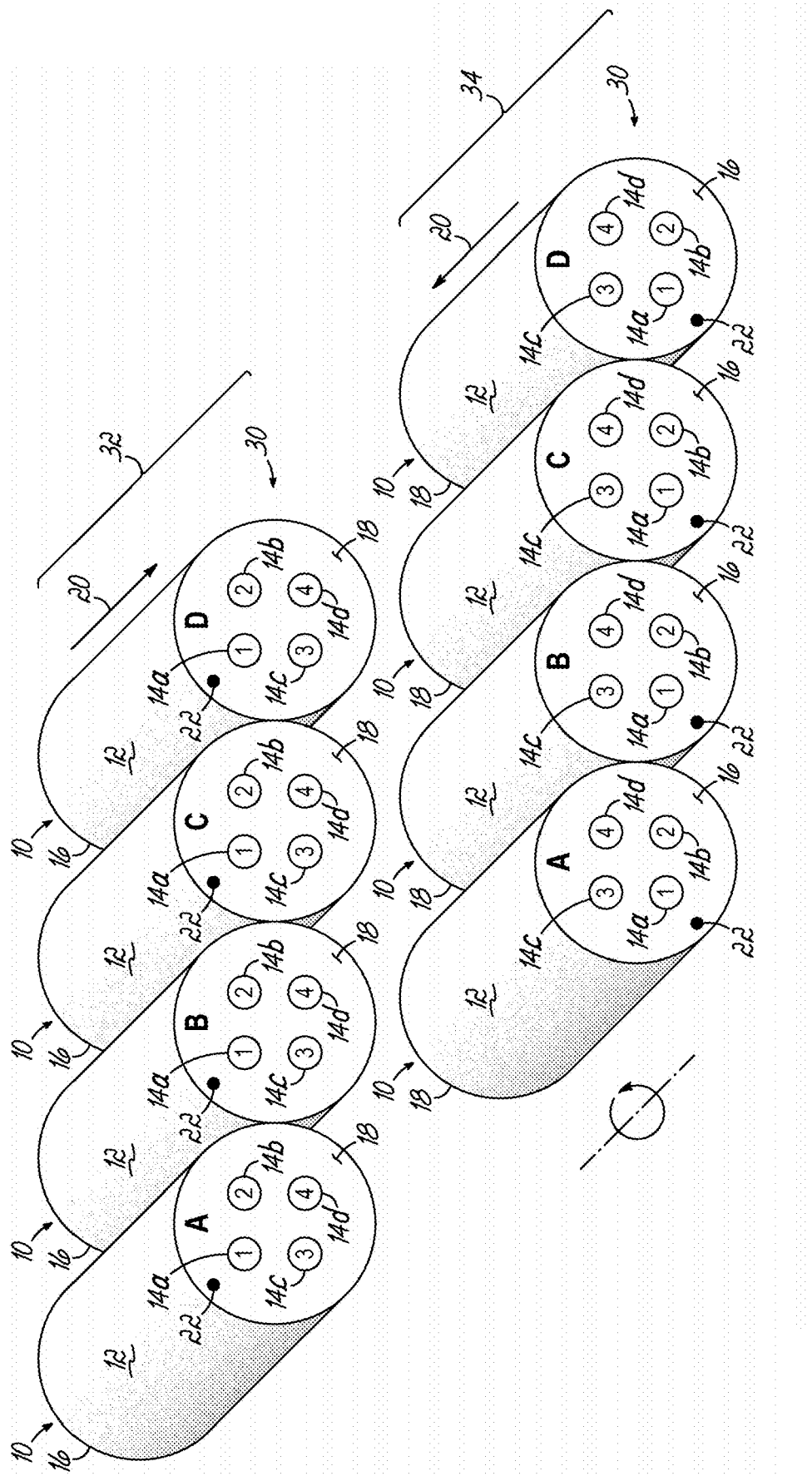

Various embodiments will be further clarified by examples described below. In general, the description relates to fiber optic ribbons ("ribbons") and/or groups of ribbons including anti-parallel multicore optical fibers having core patterns that provide mirror-image symmetry. This general statement is better understood when considering the definitions of terms used in the statement. In particular, the term "fiber optic ribbon" or "ribbon" in this disclosure refers to a group of optical fibers (e.g., 4, 8, 12, or 24 optical fibers) that are configured to be arranged side-by-side in a linear array (even if stored in a rolled or other form), with adjacent optical fibers being held together at least intermittently by a binding material (e.g., adhesive), tape, or the like. The optical fibers are considered to extend along a longitudinal axis at any given location along a length of the ribbon, and the linear array is defined in a plane orthogonal to the longitudinal axis. To the extent the optical fibers of the ribbon are described as being "parallel", this merely refers to adjacent optical fibers being held together so as to generally extend together along the longitudinal axis (i.e., intended to extend parallel). With respect to multicore optical fibers having a draw direction due to an asymmetric core pattern (see Background section above), the term "anti-parallel" refers to at least two of such multicore optical fibers being parallel but having opposite draw directions. And finally, term "mirror-image symmetry" refers to the optical fibers of the ribbon being in the linear array form and there being intended symmetry of core patters about an axis of symmetry that: a) is in the plane orthogonal to the longitudinal axis, and b) corresponds to either an x-axis or y-axis associated with the linear array.

The mirror-image symmetry of the ribbons enables connections between fiber spans to maintain core polarity independent of the direction, or "ribbon direction", of the ribbons being connected. The ribbons may, for example, be contained in cables and have ends terminated by optical connectors. Ribbons configured in accordance with the disclosed embodiments allow consistent core polarity mapping from one span to another independent of the ribbon direction, and thereby facilitate deployment of efficient structured multicore fiber optic cabling systems that include such ribbons.

In particular, ribbons of the present disclosure include anti-parallel multicore optical fibers. The anti-parallel multicore optical fibers may be arranged in the ribbon in any manner that results in the ribbon having mirror-image symmetry with regard to core patterns. This core pattern mirror-image symmetry allows the ribbon (typically as part of a fiber optic cable or cable assembly) to be connected to another ribbon having the same mirror-image symmetry without regard to the ribbon direction of either ribbon. As described in detail below, this bi-directional connectivity provides unique advantages over known arrangements.

Figure 4A:
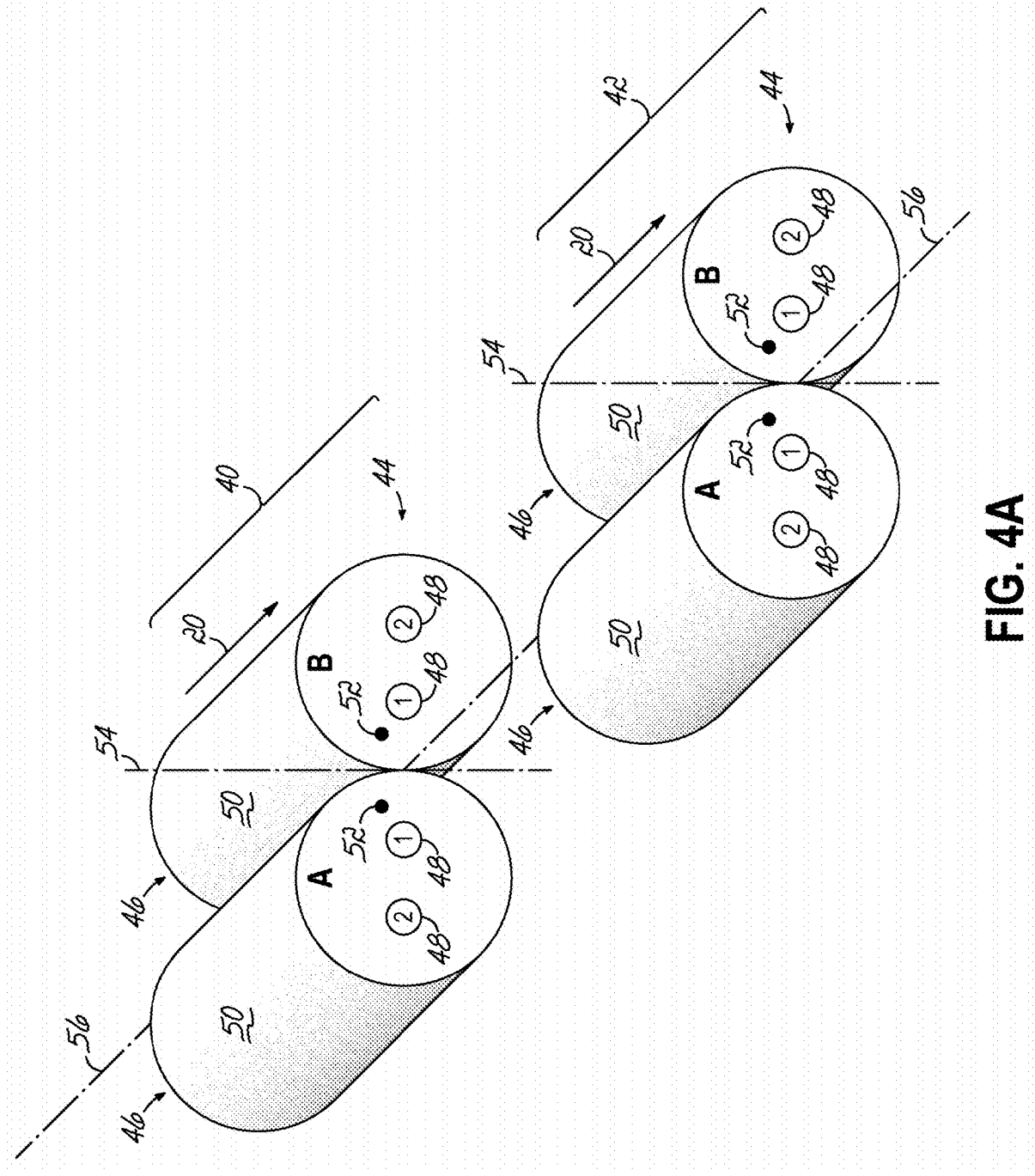
FIGS. 4A and 4B are perspective views of exemplary ribbons having an antiparallel configuration in which core polarity is maintained without regard to the draw direction of the cables.
Figure 4B:
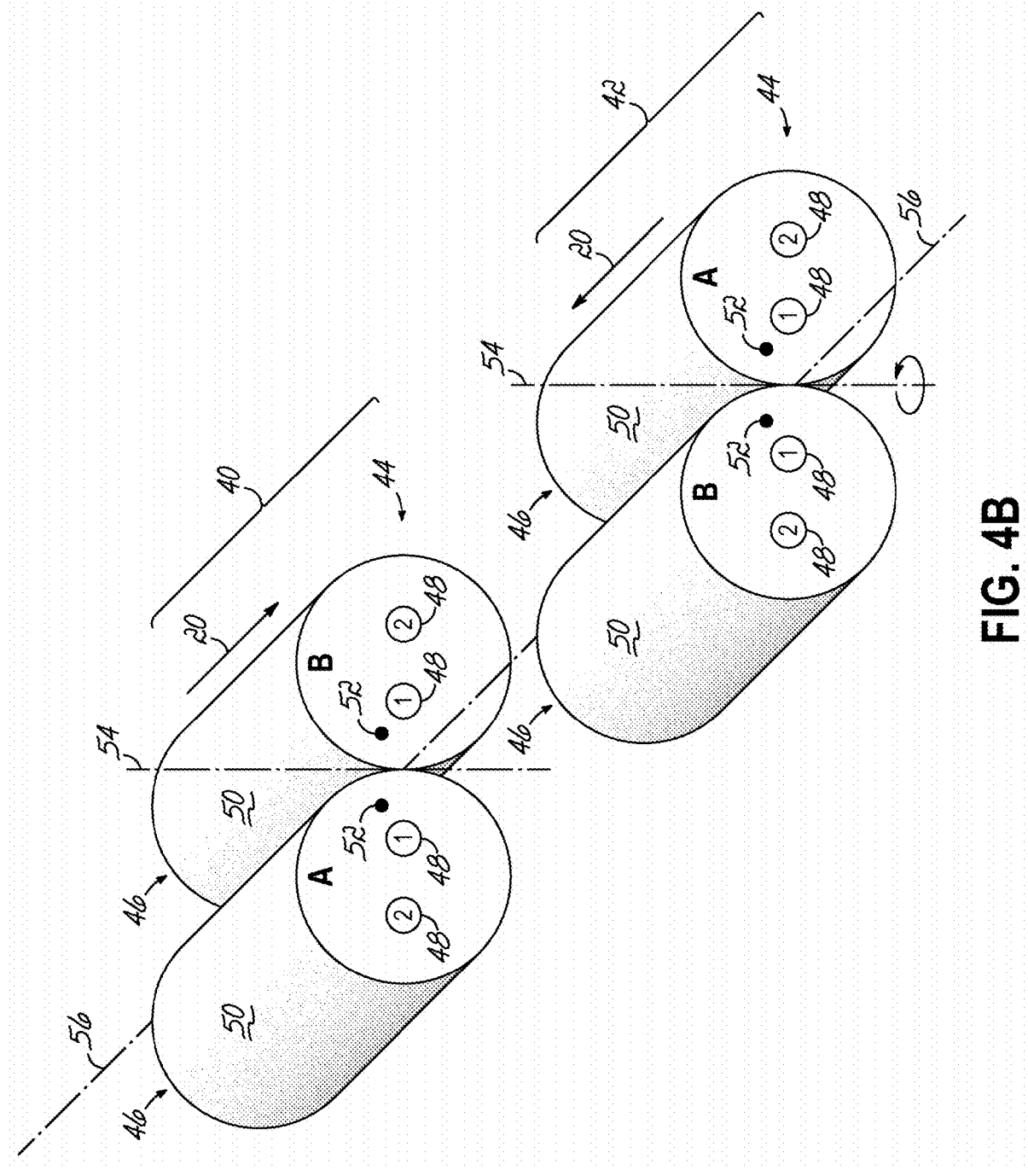

FIGS. 4A and 4B depict two fiber spans 40, 42 each including an exemplary ribbon 44 having a plurality of multicore optical fibers 46, e.g., two multicore optical fibers 46. Each multicore optical fiber 46 includes a plurality of cores 48 (e.g., two cores) within a common cladding 50, and a marker 52 that identifies one of the cores 48 as a reference core. For purposes of illustration only, and to facilitate identification by the reader, each multicore optical fiber 46 in FIGS. 4A and 4B, as well as in subsequent figures, is depicted with a letter (e.g., "A" or "B"), and each core 48 is depicted with a number (e.g., "1" or "2", with the reference core being depicted with number "1"). The marker 52 defines an asymmetry in the core pattern of each multicore optical fiber 46. This asymmetry allows the identity of each core 48 of the multicore optical fiber 46 to be determined based on its position relative to the reference core 48. For example, once the reference core 48 is identified, the remaining cores may be identified based on a predetermined naming convention for the cores 48. Although the core pattern asymmetry is depicted in this and the following examples as being provided by a marker for purposes of simplicity and clarity, it should be understood that a core pattern asymmetry can also be provided by arranging the cores in an asymmetric pattern within each individual multicore optical fiber 46, e.g., by using an off position reference core.

The ribbon 44 may be characterized in that the core patterns are arranged to collectively define a pattern of cores 48 across the ribbon 44 which has mirror-image symmetry, i.e., symmetry about an axis of symmetry 54. The axis of symmetry 54 may be normal to a longitudinal axis 56 of ribbon 44. The longitudinal axis 56 of ribbon 44 may pass through the geometric center of a cross-section of the ribbon 44 located at the point where the axis of symmetry 54 is defined, and may be normal to the cross-section. That is, the longitudinal axis 56 of ribbon 44 may be generally centered in and parallel with the ribbon 44.

Mirror-image symmetry may be achieved by the multicore optical fibers 46 having the same core pattern asymmetry and being in parallel with opposite draw directions, i.e., being in an anti-parallel configuration. In FIG. 4A, the ribbon 44 of lower fiber span 42 has the same ribbon direction as the ribbon 44 of upper fiber span 40. In FIG. 4B, the ribbon 44 of lower fiber span 42 has a ribbon direction opposite that of the ribbon 44 of upper fiber span 40. As can be seen by comparing the positions of the cores 48 in FIGS. 4A and 4B, the mirror-image symmetry of ribbons 44 maintains core polarity across the multicore optical fibers 46.

Figure 5A:
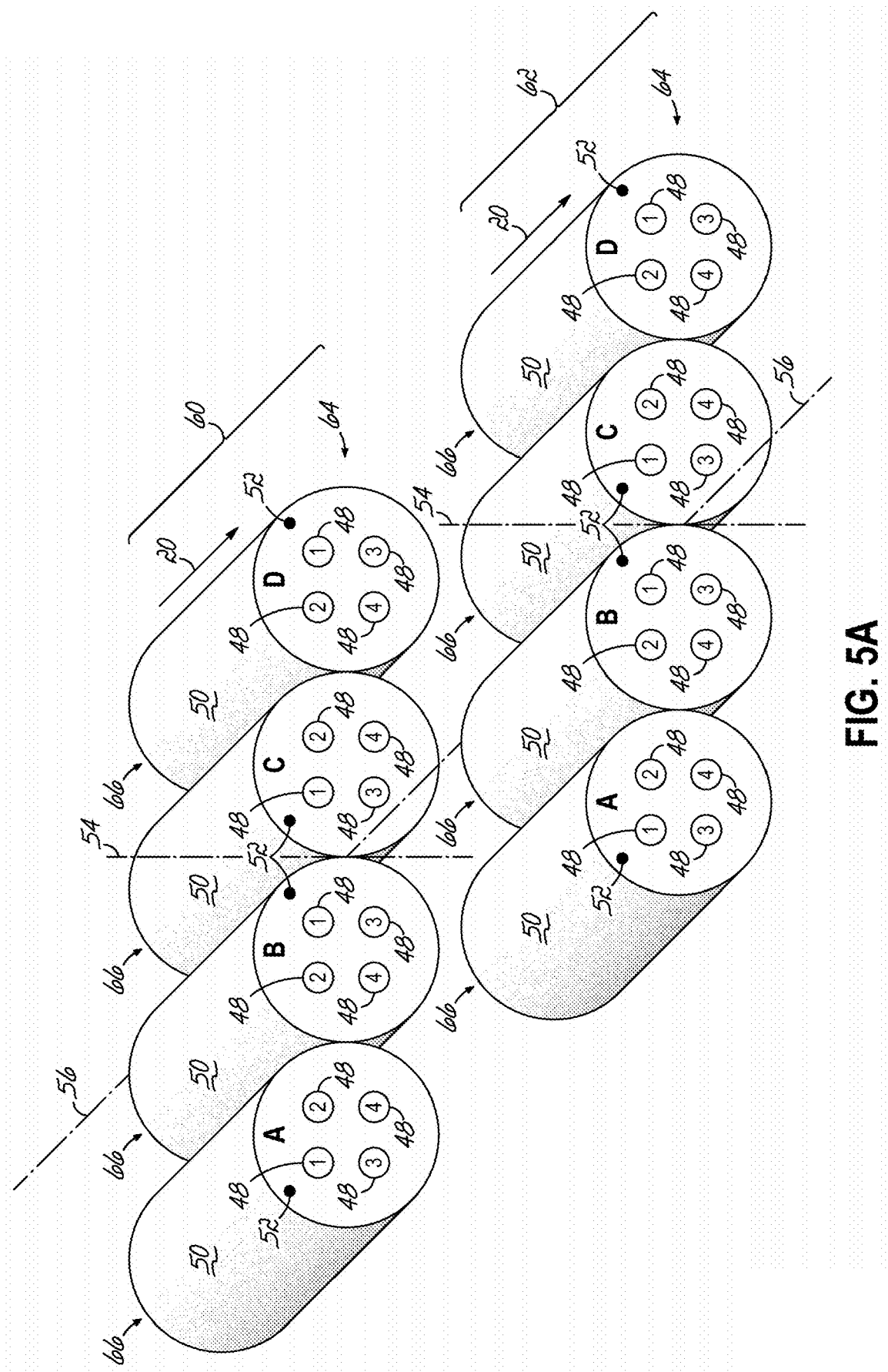
FIGS. 5A and 5B are perspective views of additional exemplary ribbons having an antiparallel configuration in which core polarity is maintained without regard to the draw direction of the cables.
Figure 5B:
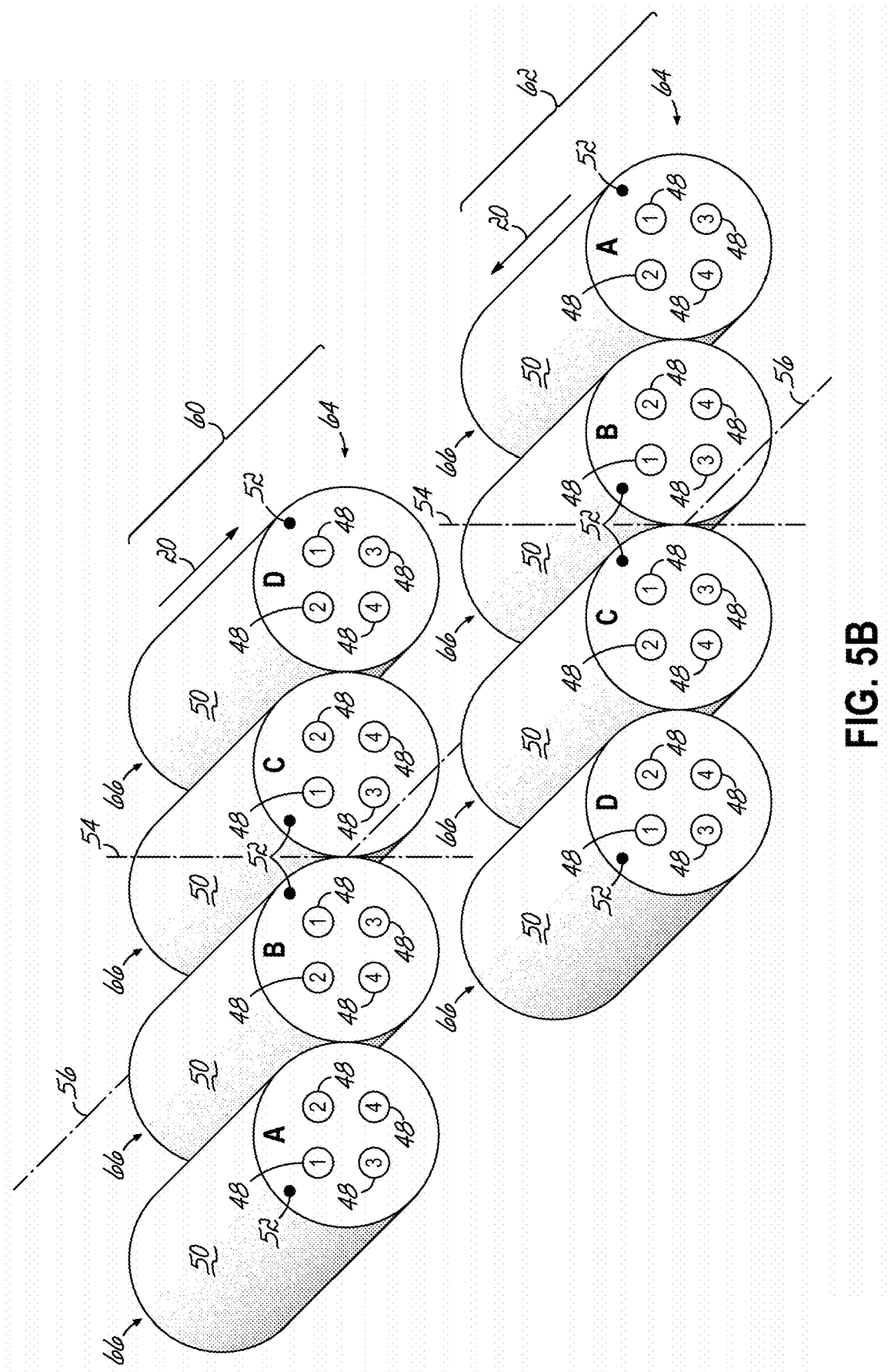

FIGS. 5A and 5B depict two fiber spans 60, 62 each including another exemplary ribbon 64 having a plurality of multicore optical fibers 66, e.g., four multicore optical fibers 66. Each multicore optical fiber 66 includes a plurality of cores 48 (e.g., four cores 48) within a common cladding 50, and a marker 52 that identifies one of the cores 48 as the reference core. The multicore optical fibers 66 are arranged so that they collectively define a pattern of cores 48 across the ribbon 64 which has mirror-image symmetry about the axis of symmetry 54 of the ribbon 64. In this case, mirror-image symmetry is achieved by alternating the draw direction of every-other multicore optical fiber 66 of each ribbon 64.

In FIG. 5A, the ribbon 64 of lower fiber span 62 has the same ribbon direction as the ribbon 64 of upper fiber span 60. Accordingly, each core 48 of each multicore optical fiber 66 in the upper fiber span 60 is aligned with a correspondingly numbered core 48 of a respective multicore optical fiber 64 of the lower fiber span 62. In FIG. 5B, the ribbon 64 of lower fiber span 62 has a ribbon direction opposite that of the ribbon 64 of upper fiber span 60. As can be seen by comparing the positions of the cores 48 in FIGS. 5A and 5B, the mirror-image symmetry of ribbons 64 maintains the core polarity of each multicore optical fiber 66. That is, although the multicore optical fibers 66 in the lower fiber span 62 are not aligned with the same multicore optical fibers 66 in the upper fiber span as in FIG. 5A, each core 48 of each multicore optical fiber 66 in the upper fiber span 60 is aligned with a correspondingly numbered core 48 of the ribbons 64 of the lower fiber span 62. Thus, connecting ribbons 64 with opposing ribbon directions maintains the core polarity of each multicore optical fiber 66 of ribbons 64.

Figure 6:
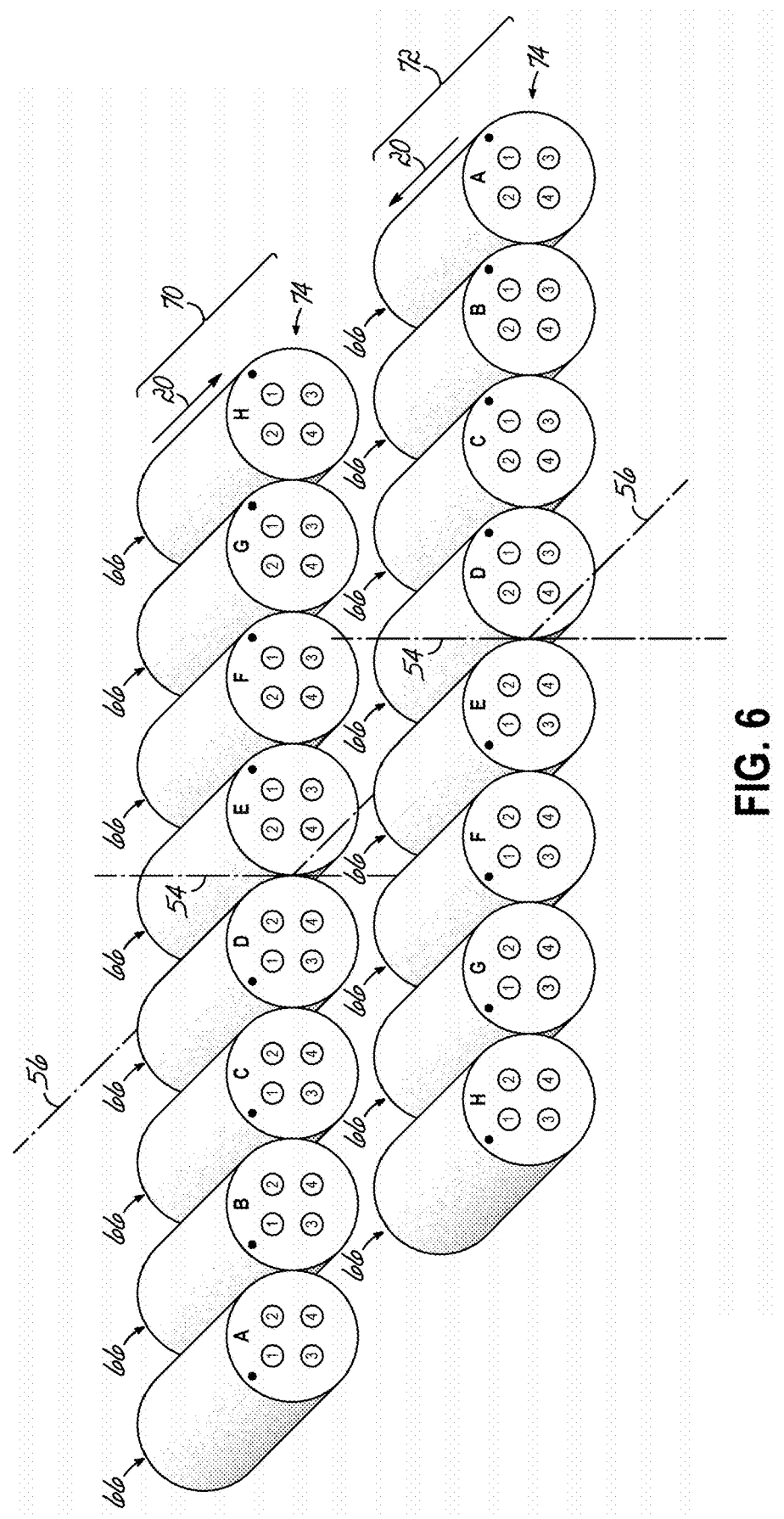
FIG. 6 is a perspective view of additional exemplary ribbons having an antiparallel configuration in which core polarity is maintained without regard to the draw direction of the cables.

FIG. 6 depicts two fiber spans 70, 72 each including another exemplary ribbon 74 having a plurality of multicore optical fibers 66 (e.g., eight multicore optical fibers 66) arranged so that they collectively define a pattern of cores 48 across the ribbon 74 which has mirror-image symmetry. In the depicted embodiment, this symmetry is achieved by the multicore optical fibers 66 on one side of the axis of symmetry 54 having one draw direction, and the multicore optical fibers 66 on the other side of the axis of symmetry 54 having another draw direction opposite that of the other draw direction. That is, the multicore optical fibers 66 on the one side of the axis of symmetry 54 are anti-parallel to the multicore optical fibers 66 on the other side of the axis of symmetry.

The ribbon 64 of lower fiber span 72 has a ribbon direction opposite that of the ribbon 74 of upper fiber span 70. As can be seen by comparing the positions of the cores 48 in the upper and lower fiber spans, the mirror-image symmetry of ribbons 74 maintains the core polarity of each multicore optical fiber 66. Although each multicore optical fiber 66 in the lower fiber span 72 is not aligned with the correspondingly lettered multicore optical fiber 66 in the upper fiber span 70, each core 48 of each multicore optical fiber 66 in the upper fiber span 70 is aligned with a correspondingly numbered core 48 of the ribbons 74 of the lower fiber span 72. The mirror-image symmetry of the ribbons 74 thus maintains the core polarity of each multicore optical fiber 66. Maintaining core polarity enables the individual optical signals carried by each core to be tracked by merely recording connections between multicore optical fibers. This greatly reduces the cable management burden as compared to conventional ribbons.

Figure 7:
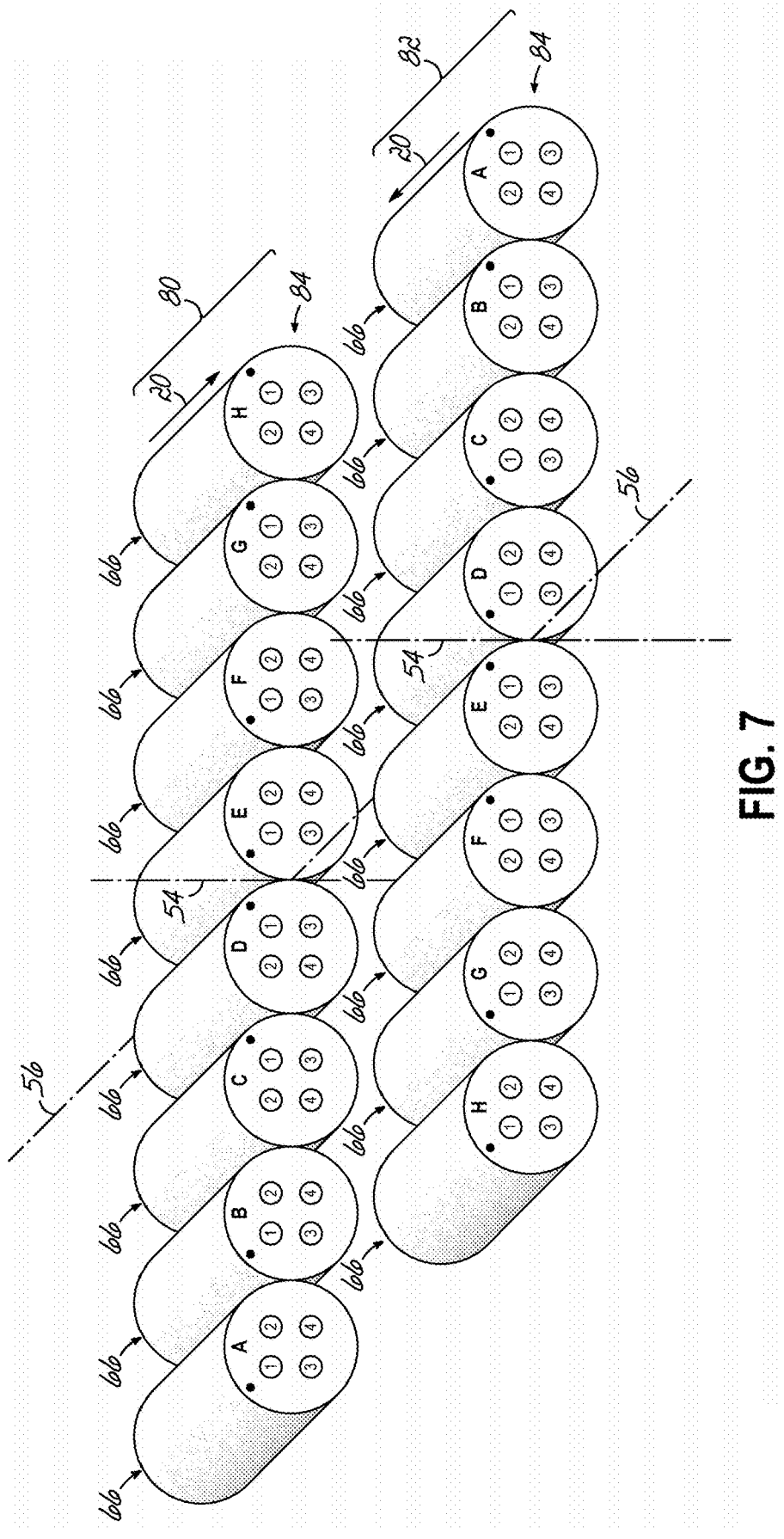
FIG. 7 is a perspective view of additional exemplary ribbons having an antiparallel configuration in which core polarity is maintained without regard to the draw direction of the cables.

FIG. 7 depicts two fiber spans 80, 82 each including another exemplary ribbon 84 having a plurality of multicore optical fibers 66, e.g., eight multicore optical fibers 66. The ribbon 84 is similar to that depicted in FIG. 6, except that mirror-image symmetry is achieved by alternating the draw direction of equally-sized subunits (e.g., pairs) of multicore optical fibers 66 of each ribbon 66. Thus, although the ribbon 84 of lower fiber span 82 has a ribbon direction opposite that of the ribbon 84 of upper fiber span 80, the mirror-image symmetry of ribbons 84 maintains the core polarity of each multicore optical fiber 66 across the fiber spans 80, 82.

It should be understood that many different core patterns and configurations of multicore optical fibers may be used to produce a ribbon having mirror-image symmetry. Moreover, although the exemplary ribbons described above are generally depicted as ribbon cables for purposes of clarity, embodiments are not limited solely to this type of arrangement. For example, ribbons may be expanded vertically by stacking arrangements of multicore optical fibers similar to those depicted herein.

Typically, ribbons having mirror-image symmetry will have an even number of multicore optical fibers. However, an odd number of fibers may be used if the core pattern of the center fiber itself has mirror-image symmetry. Although the above examples are limited to ribbons having between two and eight multicore optical fibers, there is no specific limit to the number of multicore optical fibers that can be assembled into a ribbon. The multicore optical fibers may also have different numbers of cores and cores arranged in different patterns than shown. For example, cores may be arranged in patterns that have radial symmetry or that lack radial symmetry. Reference cores may be indicated by a marker embedded in the multicore optical fiber, or may be indicated by being in an off normal position.

Advantageously, the cost of manufacturing ribbons having mirror-image symmetry should not be significantly higher than for conventional fiber optic ribbons. The same manufacturing processes may be used to make the multicore optical fibers from which the ribbons are assembled, and for coating the ribbons after assembly. To form the desired pattern of anti-parallel multicore optical fibers, the end face of the multicore optical fiber on each fiber reel may be inspected to determine the draw direction, e.g., by observing the orientation of the core patterns.

Figure 8:
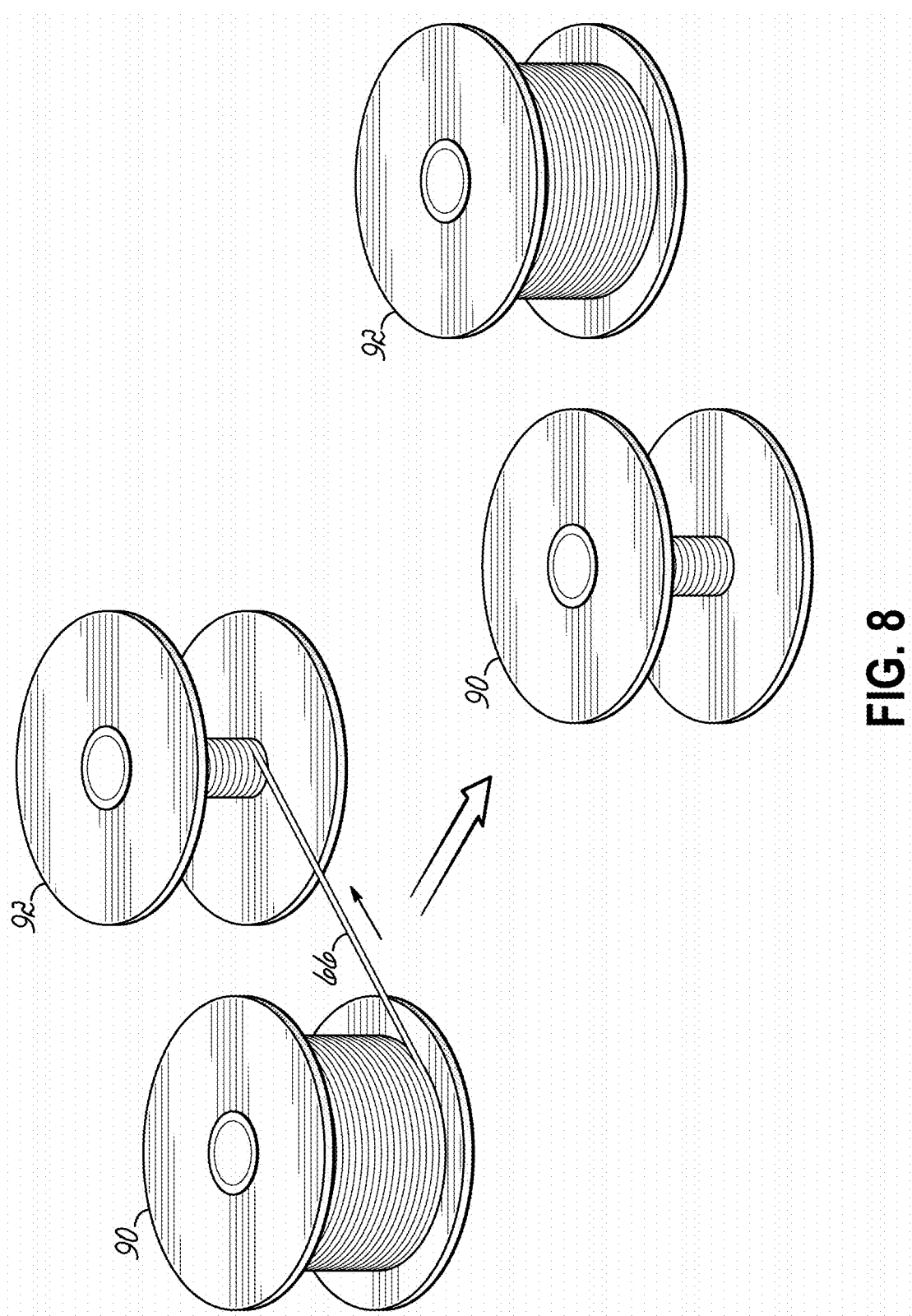
FIG. 8 is a diagrammatic view of exemplary feed and take-up reels that may be used to reverse the draw direction of any of the multicore optical fibers of FIGS. 4A-7.

Referring now to FIG. 8, a fiber reel having the wrong draw direction for the multicore optical fiber being added to a ribbon may be used as a feed reel 90, and the multicore optical fiber 66 wound onto a take up reel 92 as shown. The action of re-winding the multicore optical fiber 66 reverses the draw direction. The fiber reels with the corresponding draw direction may then be fed to a machine for making ribbons or loose tube cables using an otherwise standard process. The marked direction of a reference multicore optical fiber 66 may define the ribbon direction of the ribbon 64. For ease of use, the outer sheath or jacket of the ribbon may have periodic markings that indicate the ribbon direction of the ribbon 64.

The multicore optical fibers in the ribbon may be encapsulated in one or more layers of a suitable matrix in the same manner as conventional fiber optical cables. In the case of ribbons, individual multicore optical fibers or subunits thereof may be intermittently connected by adhesive spots to form a rollable ribbon. The multicore optical fibers may also be placed in loose tubes without a matrix or adhesive spots.

A multicore fiber trunk cable may be assembled from multiple direction-managed ribbons. Preferably, the ribbon direction of each ribbon of the multicore fiber trunk may be aligned in the same direction. The multicore fiber trunk cable design may be similar to that of fiber trunk cable using standard single mode fibers. In an alternative embodiment, a two-way ribbon cable such as depicted by FIG. 6 may be split into two anti-parallel one-way ribbons inside the multicore fiber trunk cable.

Figure 9:
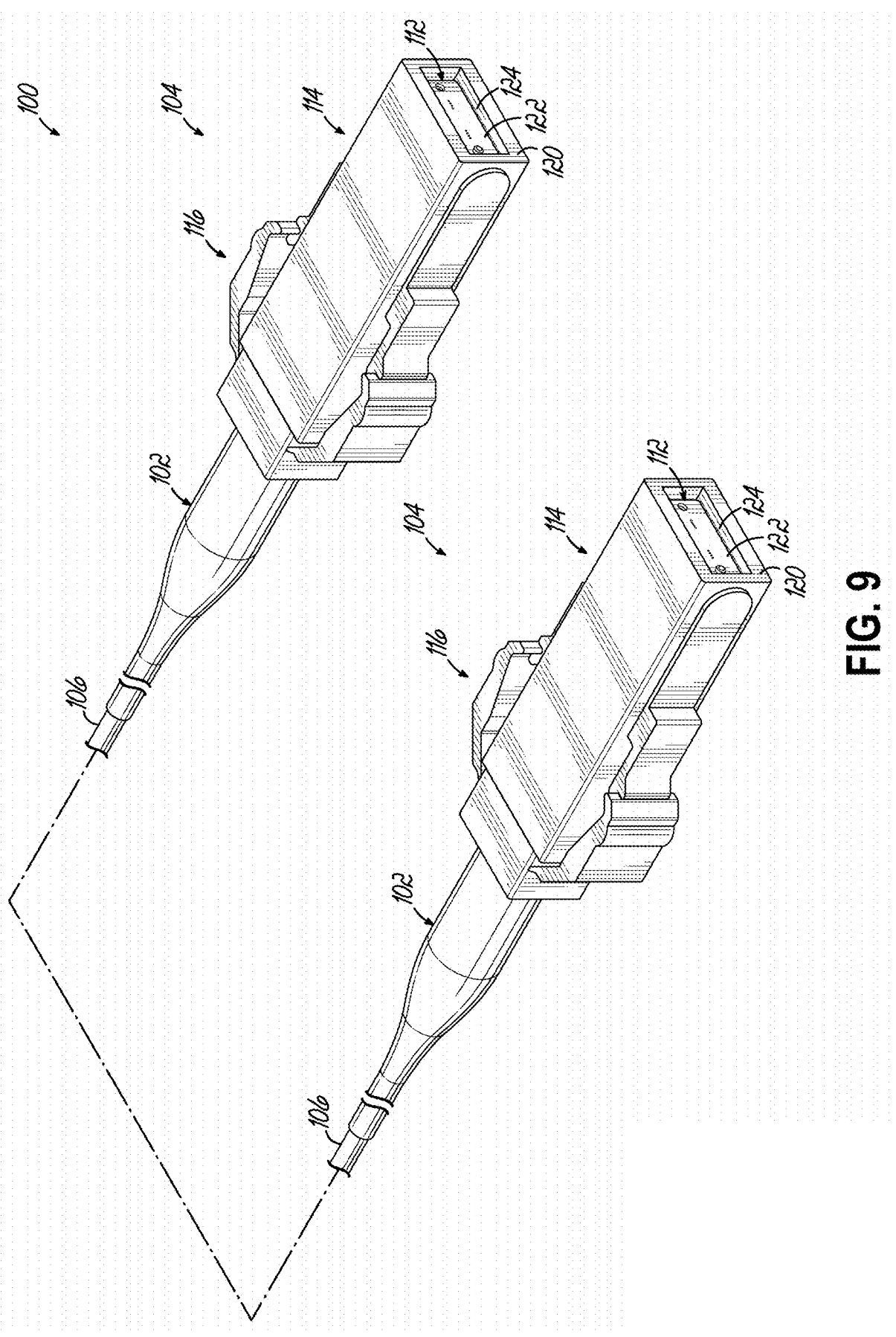
FIG. 9 is a perspective view of an exemplary fiber optic cable assembly including connectors at each end in which multicore optical fibers are arranged relative to each other so that the core pattern has a mirror-image symmetry at both ends of the fiber optic cable assembly.
Figure 10:
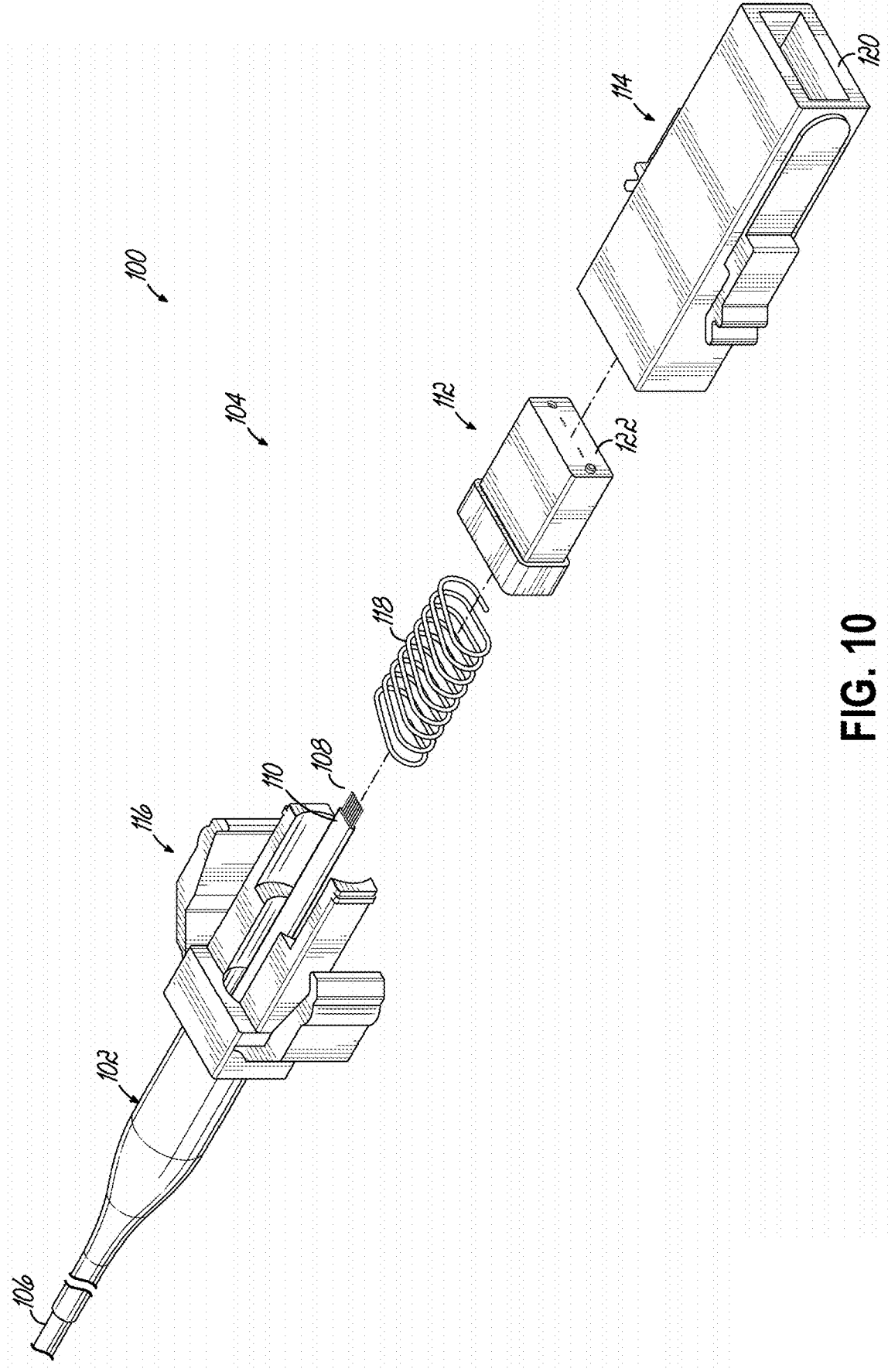
FIG. 10 is an exploded perspective view of one of the connectors of the fiber optic cable assembly of FIG. 9.
Figure 11:
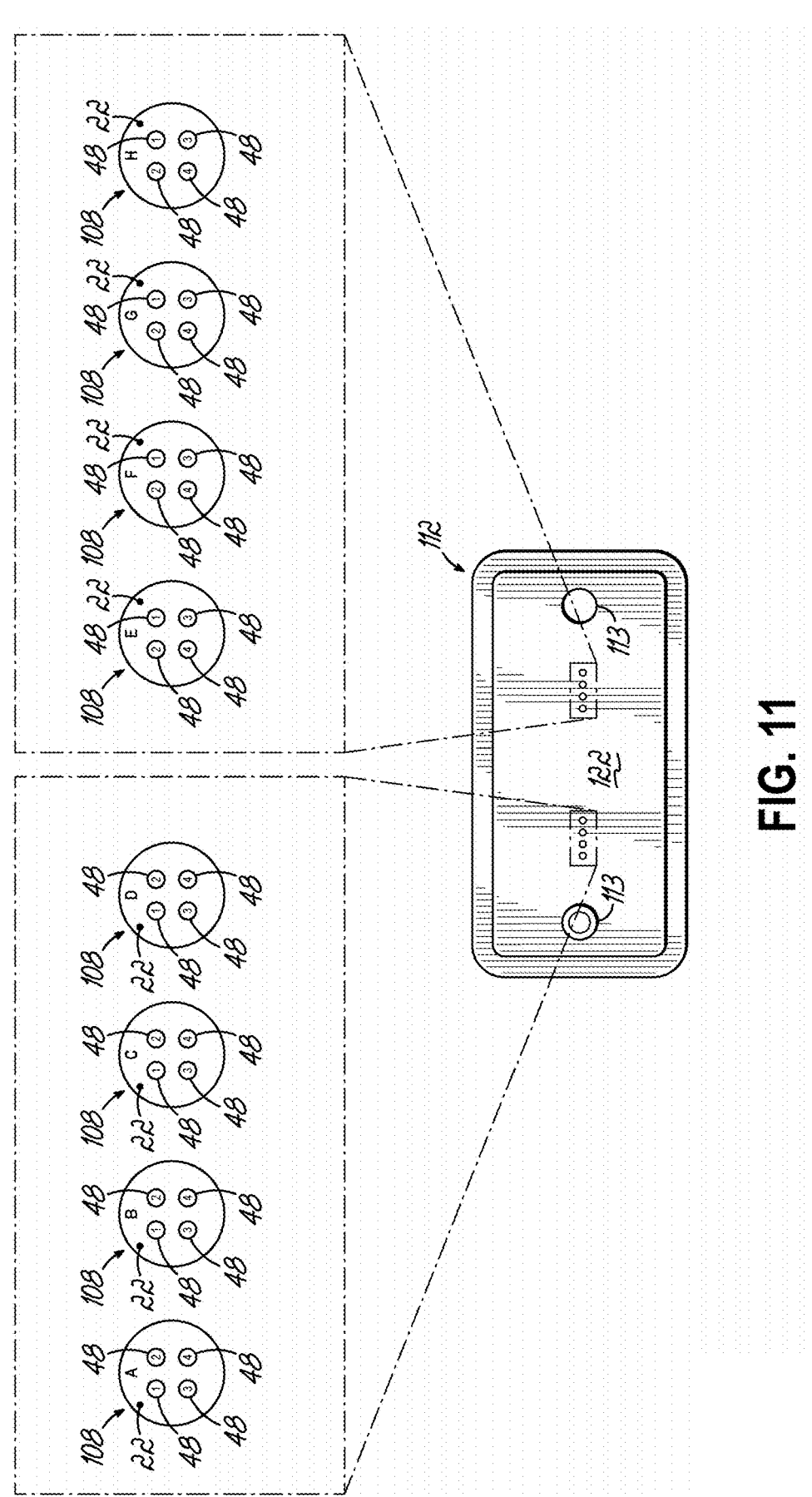
FIG. 11 is an end view of one of the connectors of the fiber optic cable assembly of FIG. 9.

Ribbons may be used individually or in groups to form fiber optic cable assemblies. FIGS. 9-11 depict an exemplary fiber optic cable assembly 100 that includes a fiber optic cable 102 terminated at each end by a respective fiber optic connector 104, which may also be referred to as "optical connector", or simply "connector". The connector 104 is shown with a particular configuration for a multi-fiber connector, but the fiber optic cable assembly 100 may alternatively include other connector designs, such as MPO-type connectors, for example. While the fiber optic cable assembly 100 is illustrated as including one connector 104 at each end thereof, it should be realized that the fiber optic cable 102 may include a large number of optical fibers and be terminated by multiple connectors 104. Thus, aspects of the present disclosure are not limited to the particular cable 102 and connectors 104 shown and described herein. The fiber optic cable 102 includes an outer jacket 106 that surrounds and protects a plurality of optical fibers 108. The optical fibers 108 may be configured as one or more ribbons 110 each including a plurality of multicore optical fibers 108 arranged in a side-by-side manner as described above.

Each connector 104 may include a ferrule 112 having one or more guide holes 113 and configured to support the plurality of optical fibers 108, a housing 114 having a cavity in which the ferrule 112 is received, and a connector body 116 configured to support the fiber optic cable 102 and retain the ferrule 112 within the housing 114. The ferrule 112 may be biased to a forward position within the housing 114 by a spring 118. The housing 114 and the connector body 116 may be coupled together, such as through a snap fit or the like, to capture the ferrule 112 within the housing 114. When the connector 102 is assembled as shown in FIG. 9, a front end 120 of the housing 114 may project beyond an end face 122 of the ferrule 112 to define a cavity 124. The cavity 124 may be configured to receive, for example, a ferrule from a mated optic component, such as a mated connector. The construction and interoperability between the various parts of connectors 104 are generally known to persons of ordinary skill in optical connectivity and thus will not described further herein. It should be understood that aspects of the disclosure are not limited to the particular shape, size, and configuration of the ferrule or housing shown and described herein but are applicable to a wide range of ferrule and housing configurations.

As best shown by FIG. 11, the multi-core optical fibers 108 may be arranged in the ferrule 112 so that they collectively define a pattern of cores 48 across the end face 122 of ferrule 112 which has mirror-image symmetry. In the exemplary embodiment depicted, this symmetry is achieved by the multicore optical fibers 66 on one side of the ferrule 112 having one draw direction, and the multicore optical fibers 66 on the other side of the ferrule having another draw direction opposite that of the other draw direction. That is, the multicore optical fibers 66 on the one side of the ferrule are anti-parallel to the multicore optical fibers 66 on the other side of the ferrule 112.

While the present disclosure has been illustrated by the description of specific embodiments thereof, and while the embodiments have been described in considerable detail, it is not intended to restrict or in any way limit the scope of the appended claims to such detail. The various features discussed herein may be used alone or in any combination within and between the various embodiments. Additional advantages and modifications will readily appear to those skilled in the art. The present disclosure in its broader aspects is therefore not limited to the specific details, representative apparatus and methods and illustrative examples shown and described. Accordingly, departures may be made from such details without departing from the scope of the present disclosure.

What is claimed is:

1. A fiber optic ribbon including a first end and a second end, comprising:
   a first multicore optical fiber having a first core pattern and a first draw direction along a longitudinal axis of the fiber optic ribbon; and
   a second multicore optical fiber having a second core pattern that is the same as the first core pattern and a second draw direction that is opposite the first draw direction along the longitudinal axis of the fiber optic ribbon;
   wherein the first multicore optical fiber and the second multicore optical fiber are arranged relative to each other in the fiber optic ribbon so that the first core pattern has a mirror-image symmetry with the second core pattern at both the first end and the second end of the fiber optic ribbon.

2. The fiber optic ribbon of claim 1, wherein the first multicore optical fiber and the second multicore optical fiber are arranged in an anti-parallel configuration.

3. The fiber optic ribbon of claim 1, wherein:
   the first multicore optical fiber and the second multicore optical fiber are part of a plurality of multicore optical fibers consisting of a first number of multicore optical fibers with the first core pattern and the first draw direction, and a second number of multicore optical fibers with the second core pattern and the second draw direction, and
   the first number of multicore optical fibers is equal to the second number of multicore optical fibers.

4. The fiber optic ribbon of claim 3, wherein:

the mirror-image symmetry at both the first end and the second end of the fiber optic ribbon is about an axis of symmetry of the fiber optic ribbon at the respective end, there is a third number of the plurality of multicore optical fibers with the first draw direction on one side of the axis of symmetry, there is a fourth number of the plurality of multicore optical fibers with the second draw direction on the other side of the axis of symmetry, and the third number of the plurality of multicore optical fibers is equal to the fourth number of the plurality of multicore optical fibers.

5. The fiber optic ribbon of claim 4, wherein the plurality of multicore optical fibers is arranged so that the draw direction of equally-sized subunits of multicore optical fibers alternates between the first draw direction and the second draw direction.

6. The fiber optic ribbon of claim 5, wherein each subunit of the multicore optical fibers includes at least one multicore optical fiber and not more than the first number of multicore optical fibers.

7. The fiber optic ribbon of claim 6, wherein:

the fiber optic ribbon has a longitudinal axis at each end normal to a cross section of the fiber optic ribbon, each longitudinal axis passes through a geometric center of the cross section of the fiber optic ribbon, and each axis of symmetry is normal to the longitudinal axis of the respective end of the fiber optic ribbon.

8. The fiber optic ribbon of claim 1, wherein the fiber optic ribbon has an even number of the multicore optical fibers.

9. The fiber optic ribbon of claim 1, wherein each of the first core pattern and the second core pattern includes a reference core indicated by one or more of a mark-based asymmetry or a position-based asymmetry.

10. The fiber ribbon of claim 9, wherein both the first core pattern and the second core pattern follow a predetermined naming convention that uniquely identifies each core of the respective core pattern based on a position of the core relative to the respective reference core.

11. A fiber optic cable assembly including a first end, a second end, and a longitudinal axis, the fiber optic cable assembly comprising:

a first multicore optical fiber having a first core pattern and a first draw direction along the longitudinal axis;

a second multicore optical fiber having a second core pattern that is the same as the first core pattern and a second draw direction that is opposite the first draw direction along the longitudinal axis;

a first connector defining the first end of the optical cable assembly, wherein a first end of the first multicore optical fiber and a first end of the second multicore optical fiber are each secured to the first connector; and a second connector defining the second end of the optical cable assembly, wherein a second end of the first multicore optical fiber and a second end of the second multicore optical fiber are each secured to the second connector;

wherein the first multicore optical fiber and the second multicore optical fiber are arranged relative to each other in each of the first connector and the second connector so that the first core pattern has a mirror-image symmetry with the second core pattern at both the first end and the second end of the optical cable assembly.

12. A method of making a fiber optic ribbon including a first end and a second end, comprising:

providing a first multicore optical fiber having a first core pattern in a first draw direction;

providing a second multicore optical fiber having a second core pattern that is the same as the first core pattern in a second draw direction that is opposite the first draw direction; and arranging the first multicore optical fiber and the second multicore optical fiber relative to each other in the fiber optic ribbon so that the first core pattern has a mirror-image symmetry with the second core pattern at both the first end of the fiber optic ribbon and the second end of the fiber optic ribbon.

13. The method of claim 12, wherein arranging the first multicore optical fiber and the second multicore optical fiber relative to each other so that the first core pattern has the mirror-image symmetry with the second core pattern includes arranging the first multicore optical fiber and the second multicore optical fiber in an anti-parallel arrangement.

14. The method of claim 12, wherein:

the first multicore optical fiber and the second multicore optical fiber are provided as part of a plurality of multicore optical fibers consisting of a first number of multicore optical fibers having the first draw direction and a second number of multicore optical fibers having the second draw direction, and the first number of multicore optical fibers is equal to the second number of multicore optical fibers.

15. The method of claim 14, wherein the fiber optic ribbon includes an axis of symmetry, and further comprising:

arranging a third number of the plurality of multicore optical fibers with the first draw direction on one side of the axis of symmetry, and arranging a fourth number of the plurality of multicore optical fibers with the second draw direction on the other side of the axis of symmetry, wherein the third number of the plurality of multicore optical fibers is equal to the fourth number of the plurality of multicore optical fibers.

16. The method of claim 15, further comprising:

arranging the plurality of multicore optical fibers so that the draw direction of equally-sized subunits of the multicore optical fibers alternates between the first draw direction and the second draw direction.

17. The method of claim 16, wherein each subunit of the multicore optical fibers includes at least one multicore optical fiber and not more than the first number of multicore optical fibers.

18. The method of claim 12, wherein the first multicore optical fiber is provided from a first reel of multicore optical fiber wound in the first draw direction on the first reel;

the second multicore optical fiber is provided from a second reel of multicore optical fiber wound in the second draw direction on the second reel; and the method further comprises:

winding a length of multicore optical fiber from a third reel onto the second reel, wherein the third reel of multicore optical fiber is wound in the first draw direction similar to the first reel.

19. The method of claim 12, further comprising:

identifying a reference core in each of the first core pattern and the second core pattern by providing one or more of a mark based asymmetry or a position based asymmetry to the core pattern.

20. A method of making a fiber optic cable assembly including a first end and a second end, comprising:

providing a first multicore optical fiber having a first core pattern and a first draw direction;

providing a second multicore optical fiber having a second core pattern that is the same as the first core pattern and a second draw direction that is opposite the first draw direction;

securing a first connector to a first end of the first multicore optical fiber and a first end of the second multicore optical fiber to define the first end of the fiber optic cable assembly; and securing a second connector to a second end of the first multicore optical fiber and a second end of the second multicore optical fiber to define the second end of the fiber optic cable assembly, wherein the first multicore optical fiber and the second multicore optical fiber are arranged relative to each other in each of the first connector and the second connector so that the first core pattern has a mirror-image symmetry with the second core pattern at both the first end and the second end of the optical cable assembly.

16

* * * * *